No. 746,090. PATENTED DEC. 8, 1903.
W. H. JOHNSON.
BENDING MACHINE.
APPLICATION FILED MAR. 25, 1902.
NO MODEL. 7 SHEETS—SHEET 1.

WITNESSES:
Frank A. Lahle
Chas N. Leonard

INVENTOR
William H. Johnson
BY
Bradford & Hood
ATTORNEYS

No. 746,090. PATENTED DEC. 8, 1903.
W. H. JOHNSON.
BENDING MACHINE.
APPLICATION FILED MAR. 25, 1902.

NO MODEL. 7 SHEETS—SHEET 6.

WITNESSES:
Frank A. Sahle
Chas. M. Leonard

INVENTOR
William H. Johnson
BY
Bradford & Hood
ATTORNEYS

No. 746,090. PATENTED DEC. 8, 1903.
W. H. JOHNSON.
BENDING MACHINE.
APPLICATION FILED MAR. 25, 1902.
NO MODEL. 7 SHEETS—SHEET 7.

WITNESSES:
Frank A. Fahle
Chas N. Leonard

INVENTOR
William H. Johnson
BY
Bradford & Hood
ATTORNEYS

No. 746,090. Patented December 8, 1903.

UNITED STATES PATENT OFFICE.

WILLIAM H. JOHNSON, OF VEEDERSBURG, INDIANA.

BENDING-MACHINE.

SPECIFICATION forming part of Letters Patent No. 746,090, dated December 8, 1903.

Application filed March 25, 1902. Serial No. 99,859. (No model.)

*To all whom it may concern:*

Be it known that I, WILLIAM H. JOHNSON, a citizen of the United States, residing at Veedersburg, in the county of Fountain and State of Indiana, have invented certain new and useful Improvements in Bending-Machines, of which the following is a specification.

The object of my invention is to produce a machine, together with a bending and holding clamp to be used therein, capable of forming the ogee curve in shovel and other handles.

The accompanying drawings illustrate my invention.

In Figs. 1 to 4 of the drawings those parts to the rear of the face of the machine are omitted for the sake of clearness.

Figure 7:
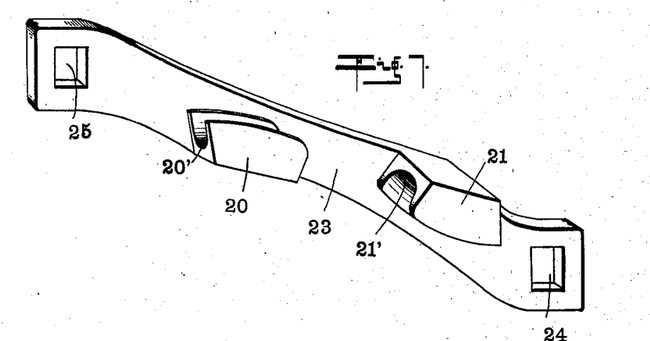
Fig. 7 is a perspective view of my improved bending and holding clamp.

In Fig. 7 I show my improved bending and holding clamp, which consists, primarily, of a pair of relatively fixed anvils 20 and 21. Anvil 20 is provided with a socket 20', approximating in transverse section nearly half of the transverse section of the handle 22 and in longitudinal section conforming to one of the inside arcs to which the handle is to be bent. Anvil 21 is provided with a similar socket 21', which is arranged in opposition to socket 20', so that the anvils may receive a handle between them. As has heretofore been stated, the two anvils 20 and 21 are relatively fixed and in the form shown are carried by a plate or bar 23, each end of which projects beyond the adjacent anvil. At that end of the bar 23 beyond the adjacent anvil 21 is a wedge or pin receiving opening 24, and at the opposite end of said bar beyond anvil 20 is a similar opening 25, the arrangement being such that wedges 24' and 25' may be inserted in the openings so as to project transversely across the axis of the sockets of anvils 20 and 21 and so as to engage the handle 22 each upon that side opposite to the side of the handle engaged by the adjacent anvil. It is to be noticed in this connection that during the operation of the bending-machine now to be described the two anvils are not directly opposed by any work-engaging surfaces which form part of the holder or clamp, so that when the wedges are withdrawn the holder may be moved longitudinally from or may be swung upon and then moved transversely free from the bent piece.

The machine to be described has been built about the bending-clamp shown in Fig. 7, the mechanism being such that the two relatively fixed anvils may be so held as to allow the projection axially therebetween of a handle, the clamping or supporting of the unbent ends of the handle, and the swinging of the relatively fixed anvils about an axis lying between the two anvils and at right angles to the axis of the handle. To this end I mount on a suitable supporting-frame 26 a rock-shaft 27, which carries at its forward end a head 28. Head 28 carries a supporting-block 29, in which is formed a transverse recess 30, which is adapted to receive the anvil 20 of any bending-holder. Formed in head 28 is a guide 31, in which is slidably mounted a jaw 32. Jaw 32 is provided with the handle-receiving socket 33 (shown in dotted lines in Figs. 1 to 4) at that end adjacent shaft 27. At the other end of jaw 32 is formed a transverse slot 34, which is adapted to receive the anvil 21, the position being such that the socket of said anvil will form a continuation of the socket 33. Extending upward from the main frame 26, parallel to the normal position of guide 31 of head 28, is a guide 36, at the lower end of which is arranged a stationary clamping-jaw 37, provided with the handle-receiving socket 37', Fig. 5. Reciprocably mounted in guide 36 is a jaw 38, which jaw is provided with a handle-receiving socket 38', arranged in alinement with the socket 37' of jaw 37, and extending through said jaw 38 is a transverse slot 39, which slot extends above socket 38' a sufficient distance to allow the insertion of wedge 25'.

The space between jaw 32 and jaw 38 may, if desired, be bridged by one of the backing-springs shown and claimed in my pending application, Serial No. 85,714; but in the present drawings I have shown said space bridged by a series of intermediate jaws 40, 41, 42, and 43, the particular number thereof being immaterial, but each being provided at its lower end with a socket (see dotted lines, Fig. 3) to conform to the external curve of the first bend of the ogee to which the handle is to be brought. Jaw 43 is pivotally connected to jaw 38 by means of a link 44, jaws 43 and 42 are connected by a link 45, jaws 42 and 41 are connected by a link 46, jaws 40 and 41 are connected by a link 47, the said links being arranged near the lower ends of the jaws, and jaw 40 is connected at its upper end to the head 32 by means of a slot-and-pin connection, the pin 48 being carried by the head and the slot 48' being formed in the upper end of jaw 40. For the purpose of properly swinging the jaws 40, 41, 42, and 43 I pivot at 49 on jaw 39 a lever 50. Pivotally connected to said lever are links 51, 52, and 53, which links at their opposite ends are pivotally connected to the upper ends of jaws 43, 42, and 41, respectively, the proportions being such that by swinging lever 50 the jaws 43, 42, and 41 will be so swung as to remain substantially normal at any time to the curve assumed by the handle during the process of bending. In order to swing lever 50 properly, the said lever is connected by link 54 to the jaw 32.

Pivoted at 55 on head 28 is an abutment-head 56, which carries an abutment 57, adapted to engage the end of the handle 22. Head 56 also carries a jaw 58, which is provided with a handle-receiving socket (shown in dotted lines in Fig. 1) which may be brought into alinement with the socket of jaw 37. The space between jaw 58 and recess 30 is bridged by one of my laminated backing-springs 59, the right-hand end, Fig. 1, of said spring being attached to a socket portion 60, which forms one end of the recess 30. Jaw 58 is separated somewhat from the abutment 57, preferably an amount a trifle greater than the width of wedge 24', and this space is normally filled by a swinging jaw 61, which is provided with a handle-receiving socket adapted to lie normally in alinement with the socket of jaw 58. Jaw 61 is carried by a lever 62, which is pivoted at 63 to the abutment-head 56. Abutment-head 56 is provided with an arm 56', to the lower end of which is pivotally connected a link 63', said link being also pivotally connected to an arm 64, adjustably mounted upon the main frame 26. Arm 64' is held in adjustment by any suitable means, such as a bolt 65, extending through an arc-shaped slot 66, formed in the main frame. Extending from or forming a part of the swinging head 28 is an arm 67, carrying a pin 68 at its lower end, the said pin lying in the slot 69, formed in one end of a link 70, the opposite end of which is pivoted to lever 62.

Figures 5, 10:
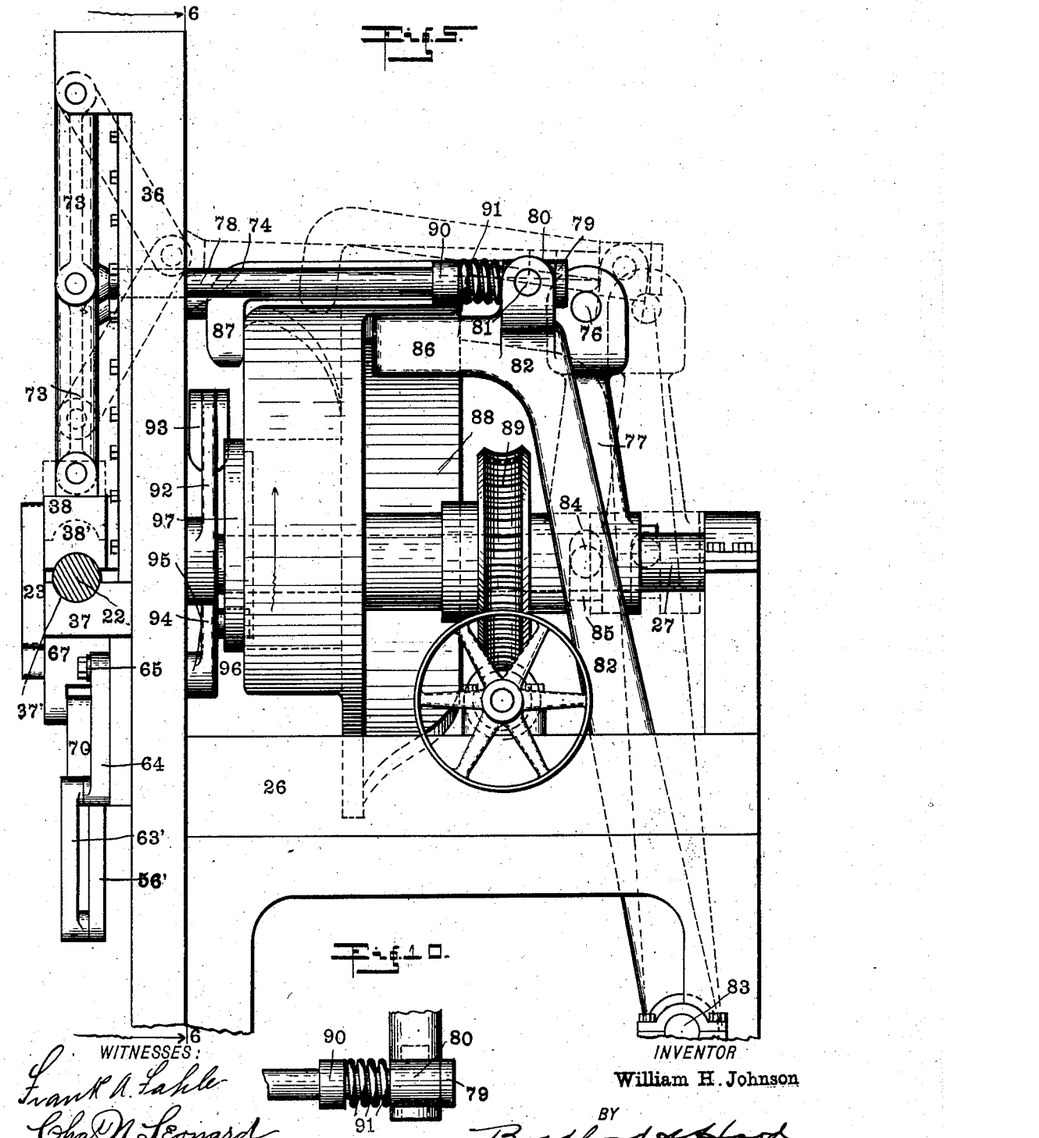
Fig. 5 is a side elevation of the parts in the position shown in Fig. 2.
Fig. 10 is a detail.

Any suitable means may be used for swinging or rocking shaft 27 and for properly operating jaws 38 and 32. In the drawings I have shown the following means for this purpose: Jaw 32 is operated by a toggle-lever 72, one end being attached to jaw 32 and the other end to the upper end of head 30. Jaw 38 is similarly operated by a toggle-lever 73, one end of which is attached to jaw 39 and the opposite end to the cross-bar of guide 36. Extending through the opening in guide 31 of head 30 is a rod 74, which is attached at its forward end to the knuckle-joint of the toggle 72 and at its rear end is provided with a head 75, having transverse trunnions 76, which are pivoted in the upper end of an arm 77, sleeved and keyed upon shaft 27, as shown in Fig. 5. Similarly a rod 78 is connected at one end to the knuckle of toggle 73 and is provided at its rear end with a collar or head 79. Slidably mounted upon rod 78 is a head 80, provided with transverse trunnions 81, which are pivoted in the upper end of an arm 82, pivoted at any suitable point, as at 83, upon the frame 26. Extending from arm 82 is a pin 84, (see dotted lines in Figs. 5 and 6,) which extends into a peripheral groove 85, formed in the hub of arm 77. Lever 82 is provided with a pair of fingers 86 and 87, which straddle a cam 88, sleeved upon rock-shaft 27. Secured to cam 88 is a suitable driving-gear 89. Rod 78 carries a second collar 90, between which and head 80 is placed a compression-spring 91, a compression of said spring taking place when the toggle 73 is straightened.

For the purpose of rocking shaft 27 I key thereto a lever 92 and connect said lever by a link 93 to a lever 94, pivoted at 95 upon the frame 26. Lever 94 carries a roller or pin 96, which projects into position to be engaged by a suitable cam 97, carried by the cam 88.

Figure 1:
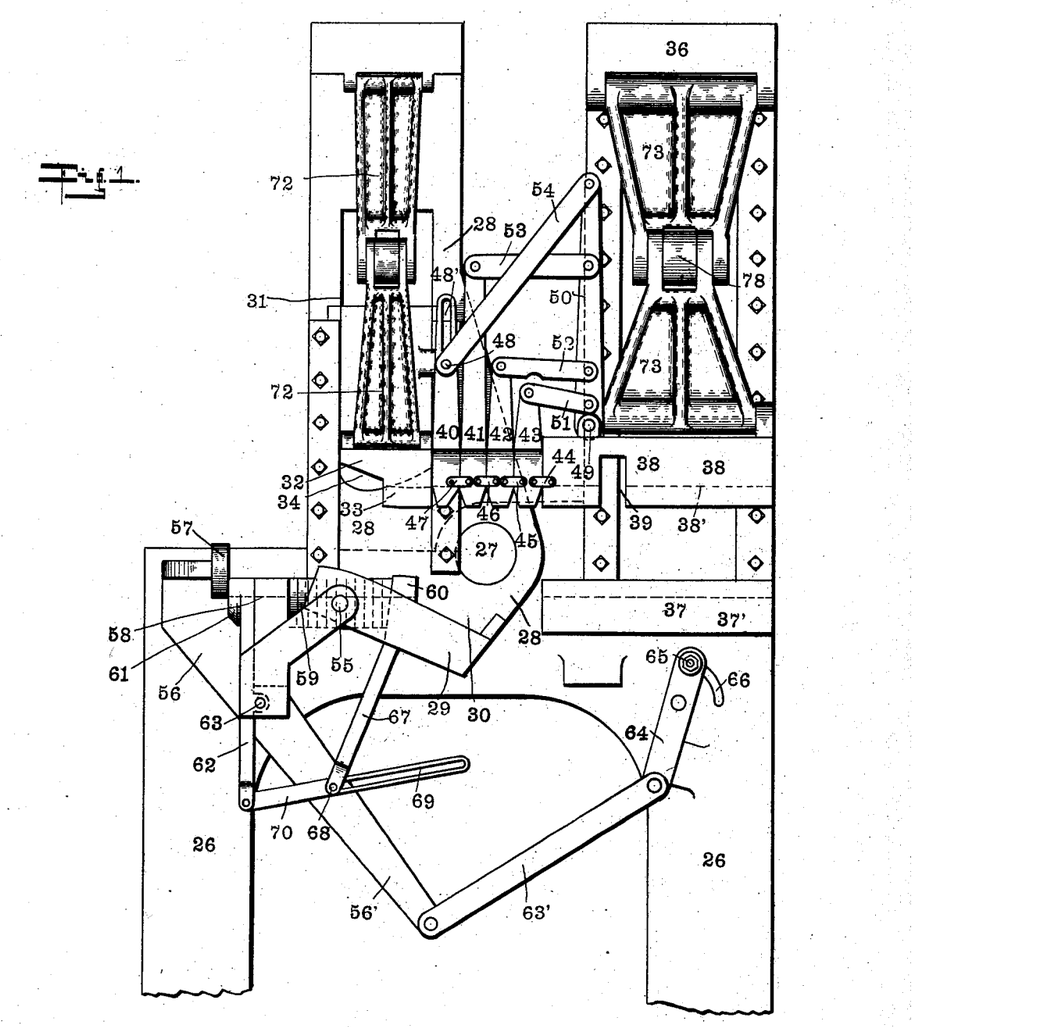
Figure 1 is a front elevation of a machine embodying my invention with the parts in receiving position.
Figure 2:
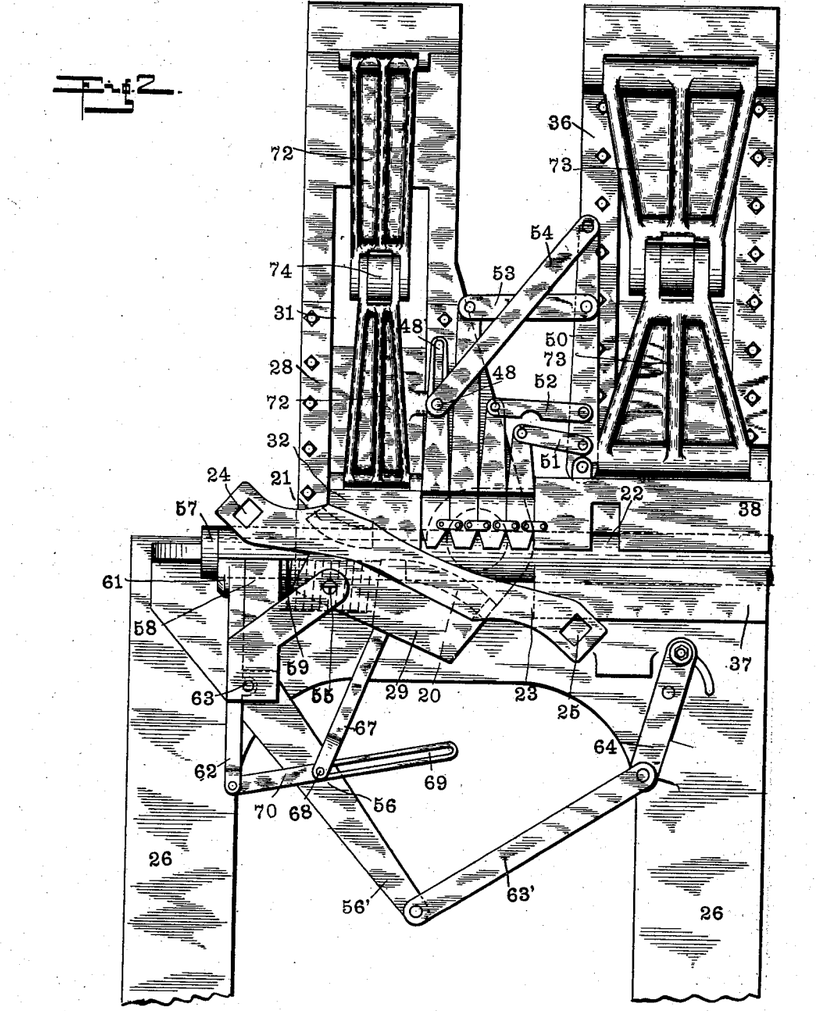
Fig. 2 is a similar view with a forming-clamp inserted and a portion of a handle in position, the several parts being in positions occupied when the jaws have engaged the handle.
Figure 3:
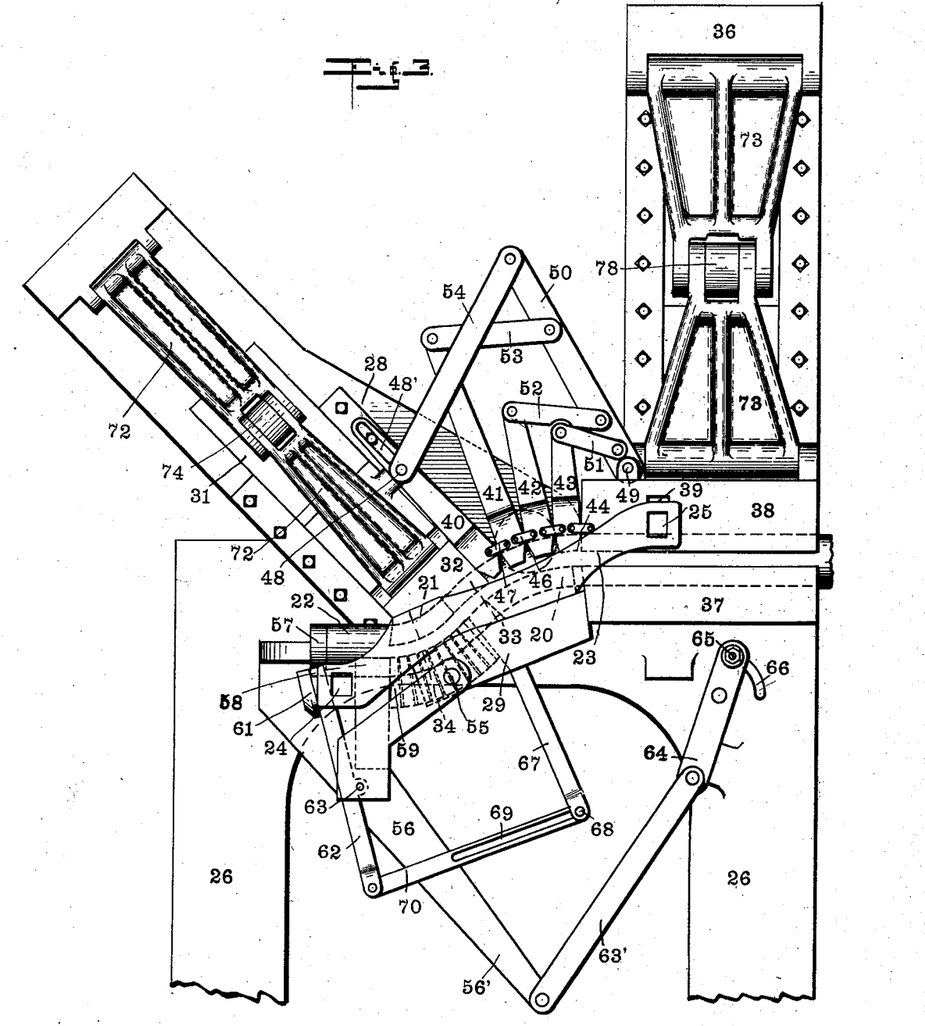
Fig. 3 is a similar view with the parts in the positions occupied at the time of completion of the bend.
Figure 4:
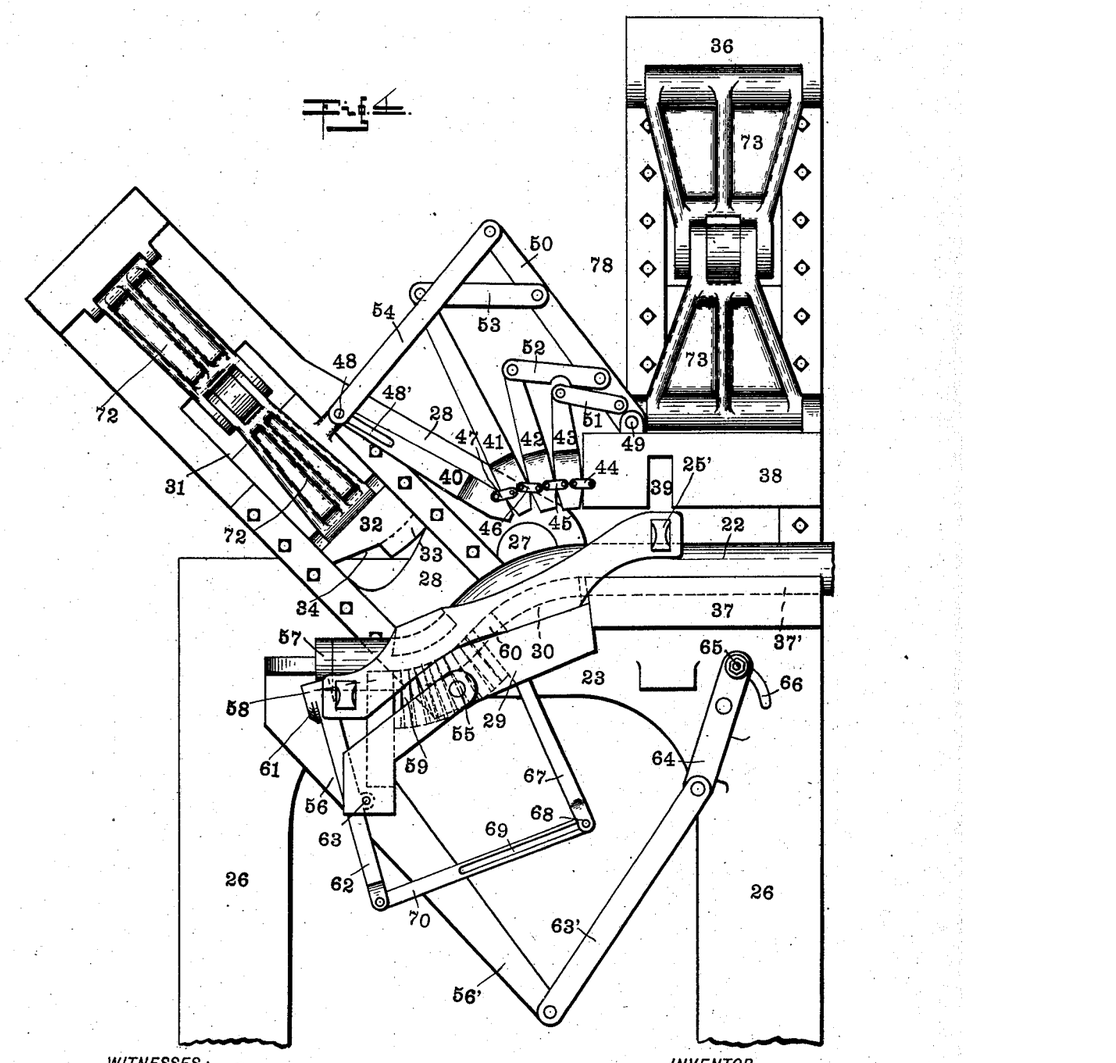
Fig. 4 is a similar view with the parts in positions to allow the withdrawal of the completed bend.
Figure 6:
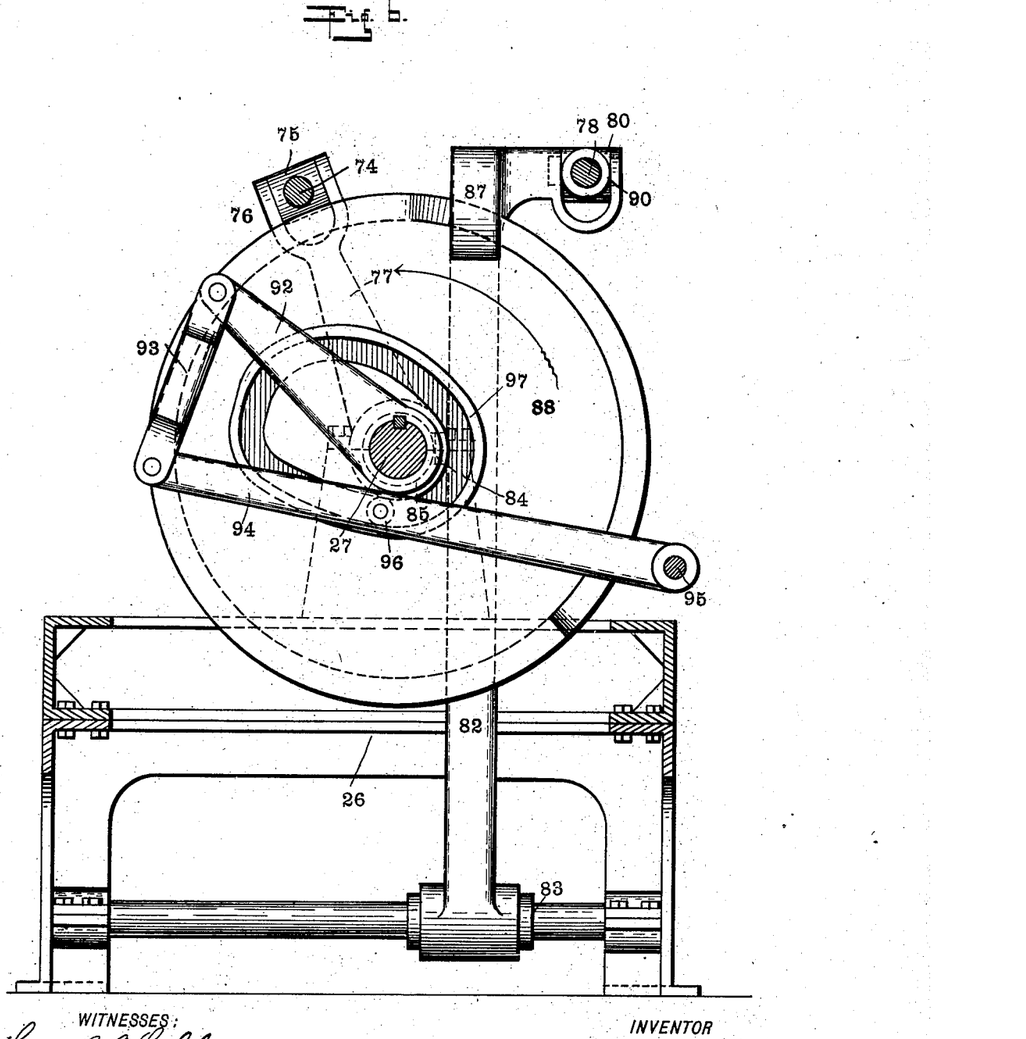
Fig. 6 is a section on line 6 6 of Fig. 5.
Figure 8:
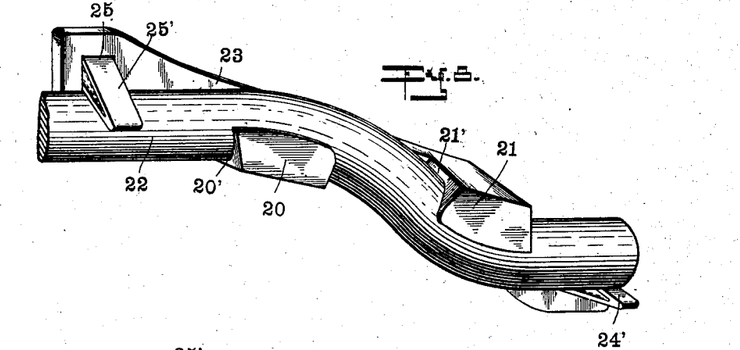
Fig. 8 is a similar view with the bent portion of a handle shown therein.
Figures 9, 11:
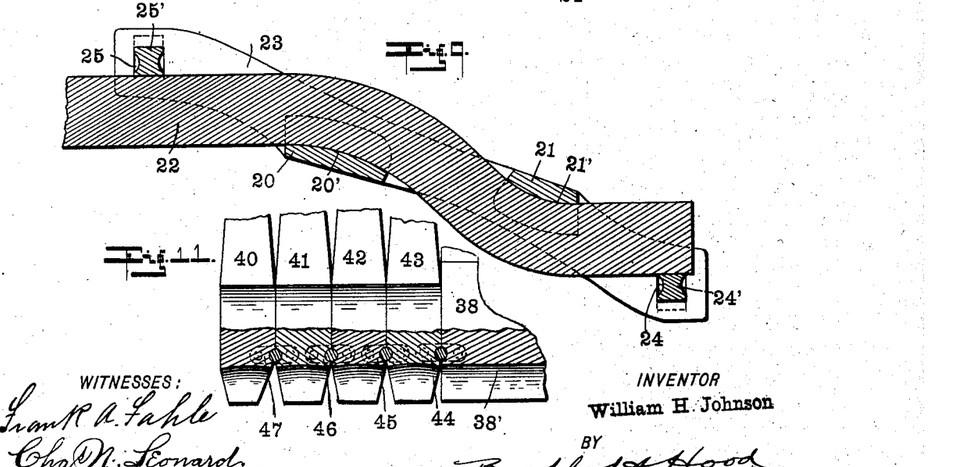
Fig. 9 is a central longitudinal section of the parts shown in Fig. 8.
Fig. 11 is an axial section through the intermedial jaws.

The operation is as follows: The normal receiving position of the machine is shown in Fig. 1, toggles 73 and 72 being broken, so as to withdraw jaws 38 and 32 upward. In this position jaws 40, 41, 42, and 43 are closely nested between jaws 32 and 38, abutment 57 is in direct alinement with jaw 37, as are also jaws 58 and 61, spring 59, and the portion 60, and the recess 30 of head 28 is in such position that when anvil 20 of the bending-holder is placed in said recess its farther end will be in alinement with the socket of jaw 38, as clearly shown in dotted lines in Fig. 2. One of the bending-formers is then placed in recess 30, being supported therein in the position shown in Fig. 2. A handle 22, which has been previously softened in any well-known manner, is then placed in the socket 37' of jaw 37 and slid endwise between the anvils 20 and 21 and its end brought into engagement with the abutment 57, the adjacent portion of the handle being supported on its lower side by jaws 61 and 58 and spring 59 in the order named. Cam 88 is then caused to revolve and by engaging finger 87 of lever 82 swings said lever so as to cause rod 78 to straighten out the toggle-lever 73, and thus move jaw 38 into tight clamping engagement with the handle 22. At the same time pin 84 shifts arm 77 along shaft 27, so as to simultaneously straighten out knuckle-joint 72 through rod 74, and thus move jaw 32 into engagement with anvil 21 and simultaneously bring the socket 33 of said jaw 32 into engagement with the handle. The substantially simultaneous movement of jaws 38 and 32 maintains the relative positions of the jaws 40, 41, 42, and 43 and brings said jaws into engagement with the upper side of that portion of the handle which extends between the two jaws 38 and 32. As soon as this occurs cam 97 has reached the position as shown in Fig. 6, and the continued rotation of said cam in the direction indicated by the arrow in said figure swings lever 94, which in turn swings lever 92 and rock-shaft 27, the rocking of said shaft moving the head 28 from the position shown in Fig. 2 to the position shown in Fig. 3. As a result of this movement of head 28, which, be it remembered, carries the bending-holder, composed of the two relatively fixed anvils 20 and 21, causes the anvil 20 to roll upon the under side of the handle, and the anvil 21 closes upon the upper side of the handle, while the end of the handle is held in substantial parallelism to its original position by means of the abutment 57 and the jaws 61 and 58, the abutment 57 being maintained in substantially vertical position by the action of link 63. During the swinging of head 28 the lever 50 has been swung into the position shown in Fig. 3 by means of link 54, and the movement of this lever causes a differential swinging of the jaws 41, 42, and 43, so that said jaws are maintained substantially normal to the first convex curve assumed by the handle, the said jaws and jaw 40 thus operating to "back up" or support the fiber of the handle along the convex curve and prevent said fiber from breaking loose or splintering, as would be the case in many handles if some support were not provided. The under or second convex curve is supported by the backing-spring 59, which, in brief, consists of a coil a portion of each bend of which has been displaced to conform to a portion of the cross-section of the handle. Just before the parts reach the positions shown in Fig. 3 pin 68 of arm 67 reaches the right-hand end of slot 69, and a continuous movement causes lever 62 to swing upon its pivot 63, so as to throw jaw 61 to the position shown in Fig. 3, and at the same time opening 24 of bar 23 is brought down opposite to the position formerly occupied by jaw 61, while opening 25 is brought up into alinement with slot 39 of jaw 38. As soon as this occurs the operator inserts the wedges 24' and 25', so as to thus form four points of support arranged in successive alternation upon opposite sides of the ogee curve formed in the handle, as shown in Figs. 8 and 9. Continued rotation of cam 88 swings lever 82 to its original position, (see dotted lines in Fig. 5,) so as to break the two toggles 72 and 73 and withdraw jaws 32 and 38 to the position shown in Fig. 4, this movement of jaw 32 being allowed by reason of the slot connection between jaw 40 and head 32. The bent handle may then be lifted out of the machine, and a continued rotation of cams 88 and 97 rocks shaft 27 back to its original position, so as to bring all parts into position shown in Fig. 1, when another bending-former may be introduced and the operation repeated. The character of the ogee curve may be altered by swinging the support 64, and thus change the relative position of the point of support of link 63.

I claim as my invention—

1. A holding-clamp for bent material, consisting of a pair of relatively fixed longitudinally-separated anvils connected at one side only and directly unopposed by any work-engaging surfaces, said anvils having adjacent faces adapted to engage opposite sides of the article to be bent, and disengageable means for engaging the material adjacent each anvil in opposition thereto.

2. A holding-clamp for bent material, consisting of a pair of relatively fixed longitudinally-separated anvils with a clear space between for the insertion of independent gripping means capable of firmly embracing the work, said anvils having adjacent faces adapted to engage opposite sides of the article to be bent, and disengageable means for engaging the material adjacent each anvil in opposition thereto.

3. A holding-clamp for bent material, consisting of a pair of relatively fixed longitudinally-separated anvils with a clear space between for the insertion of independent gripping means capable of firmly embracing the work, said anvils having adjacent faces adapted to engage opposite sides of the article to be bent, and a pair of transversely-movable wedges to engage the material in opposition to the two anvils.

4. A holding-clamp for bent material, consisting of a bar having a pair of pin-receiving openings formed therethrough, a pair of anvils projecting from one side of the bar between the openings and so arranged as to allow the insertion of material to be bent between the anvils, said anvils being directly unopposed by any work-engaging surfaces, and a pair of pins adapted to be projected through the openings in opposition to the anvils.

5. A holding-clamp for bent material, consisting of a bar having a pair of pin-receiving openings formed therethrough, a pair of anvils projecting from one side of the bar between the openings, each of said anvils approximating in transverse section a portion of the transverse section of the articles to be bent and in longitudinal section conforming to the position to which the article is to be bent, said anvil being directly unopposed by any work-engaging surfaces, and a pair of pins adapted to be projected through the openings in opposition to the anvils.

6. In a bending-machine, the combination with suitable clamping-jaws adapted to receive the article to be bent, of a bending-clamp consisting of a pair of relatively fixed longitudinally-separated anvils which are directly unopposed by any work-engaging surfaces and between which the article to be bent may be inserted, and means for moving said bending-clamp with relation to the clamping-jaws.

7. In a bending-machine, the combination with a stationary clamping-support adapted to receive the article to be bent, of a movable support for the projected end of said article, a pair of relatively fixed longitudinally-separated anvils adapted to engage the article upon opposite sides between the stationary and movable supports, and means for moving said anvils and the movable support with relation to the fixed support in such manner as to produce an ogee curve in the article.

8. In a bending-machine, the combination with a fixed clamping-support adapted to receive the article to be bent, of a swinging head supported upon an axis at an angle to the article to be bent, a jaw movably mounted upon the swinging head in position to engage and support the free end of the article to be bent, a pair of longitudinally-separated anvils carried by the movable head and adapted to engage the article to be bent upon opposite sides and between its supports, means for operating the swinging head, and means for controlling the movement of the movable support upon the swinging head.

9. In a bending-machine, the combination with a relatively fixed clamping-jaw and the swinging bending-jaw, of a plurality of backing-jaws linked together and to the adjacent clamping and swinging jaws, a lever carried by the clamping-jaw, links connecting said lever with the backing-jaws not connected to the swinging jaw, and a link connecting the lever to the swinging jaw, substantially as and for the purpose set forth.

10. In a bending-machine the combination with the supporting-frame, of a stationary clamping-jaw carried thereby, a reciprocating clamping-jaw adapted to coact therewith, a toggle-lever arranged to reciprocate said jaw, a driving-shaft arranged at right angles to the axis of the jaws, a swinging head carried by said shaft, an abutment-head pivotally mounted upon the swinging head, jaw pivoted upon the abutment-head, means carried by the swinging head for supporting a bending-clamp consisting of a bar provided at each end with a pin-receiving opening and carrying in its middle a pair of opposed anvils between which the article to be bent may be passed, a reciprocating jaw carried by the swinging head and adapted to engage one of said anvils, a toggle-lever arranged to reciprocate said jaw, a cam revolubly mounted on the shaft, means operated by the cam for operating the toggle-levers, and a cam arranged to swing the shaft and the head carried thereby, for the purpose set forth.

11. In a bending-machine, the combination, with two means for clamping the material at two points, of means for lessening the distance between said two clamping means during the action of bending, a pair of bending-anvils adapted to engage the material between the clamps, and means for moving both of said anvils with relation to the original axis of the material.

12. In a bending-machine, the combination with a support for the article to be bent, of a pair of bending-anvils between which the article may pass, each of said anvils approximating in cross-section a portion of the article to be bent and in longitudinal section conforming to the form to which the article is to be bent, means for gripping the material at a point between the anvils, and means for moving both of said anvils and said gripping means with relation to the original axis of the article.

13. In a bending-machine, the combination with a support for the article to be bent, of a pair of bending-anvils adapted to engage the article upon opposite sides, means for gripping the material at a point between the anvils, and means for simultaneously swinging said anvils and gripping means upon an axis at an angle to the article to be bent.

14. In a bending-machine, the combination of a pair of clamping means between which the article to be bent may be firmly grasped at two separated points, an intermediate clamp acting upon the article between said pair of clamps, and means for relatively moving said clamps both transversely and longitudinally of the original axis of the article.

In witness whereof I have hereunto set my hand and seal, at Indianapolis, Indiana, this 19th day of March, A. D. 1902.

WILLIAM H. JOHNSON. [L. S.]

Witnesses:
ARTHUR M. HOOD,
JAS. NELLER